(12) United States Patent
Dietrich et al.

(10) Patent No.: US 8,206,637 B2
(45) Date of Patent: Jun. 26, 2012

(54) GEOMETRY ADAPTIVE LASER SINTERING SYSTEM

(75) Inventors: David Michael Dietrich, St. Peters, MO (US); Richard L. Eason, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 473 days.

(21) Appl. No.: 12/250,665

(22) Filed: Oct. 14, 2008

(65) Prior Publication Data
US 2010/0090374 A1  Apr. 15, 2010

(51) Int. Cl.
*B29C 35/08* (2006.01)

(52) U.S. Cl. .......... 264/482; 264/85; 264/497; 264/401; 264/430; 264/460; 264/112; 264/113; 264/123; 264/125; 264/128; 425/174.4; 425/375

(58) Field of Classification Search .......... 264/401, 264/497, 430, 460, 482, 496, 85, 112, 113, 264/123, 125, 128; 425/518, 127, 163, 356, 425/427, 457, 469, 174.4, 182, 470, 375; 249/155, 160, 161; 700/118, 119, 120
See application file for complete search history.

(56) References Cited

U.S. PATENT DOCUMENTS

| | | | | |
|---|---|---|---|---|
| 881,912 | A | * | 3/1908 | Emrick .......... 249/141 |
| 2,410,888 | A | * | 11/1946 | Lucy .......... 264/219 |
| 2,968,838 | A | * | 1/1961 | Hicks .......... 249/117 |
| 4,398,693 | A | * | 8/1983 | Hahn et al. .......... 249/155 |
| 4,929,402 | A | * | 5/1990 | Hull .......... 264/401 |
| 4,944,817 | A | | 7/1990 | Bourell et al. |
| 5,133,987 | A | * | 7/1992 | Spence et al. .......... 427/581 |
| 5,281,117 | A | * | 1/1994 | Hong .......... 425/2 |
| 5,330,343 | A | * | 7/1994 | Berteau .......... 425/175 |
| 5,354,414 | A | * | 10/1994 | Feygin .......... 216/34 |
| 5,391,072 | A | * | 2/1995 | Lawton et al. .......... 425/174.4 |
| 5,393,482 | A | | 2/1995 | Benda et al. |
| 5,437,820 | A | * | 8/1995 | Brotz .......... 264/497 |
| 5,530,221 | A | | 6/1996 | Benda et al. |
| 6,054,192 | A | * | 4/2000 | Otsuka et al. .......... 264/113 |
| 6,354,561 | B1 | * | 3/2002 | Fahrion .......... 249/155 |
| 6,822,194 | B2 | | 11/2004 | Low et al. |
| 6,839,607 | B2 | | 1/2005 | Wooten |
| 2002/0090313 | A1 | * | 7/2002 | Wang et al. .......... 264/497 |
| 2002/0167101 | A1 | | 11/2002 | Tochimoto et al. |
| 2003/0205334 | A1 | * | 11/2003 | Sherrill et al. .......... 156/581 |
| 2004/0056022 | A1 | | 3/2004 | Meiners et al. |

(Continued)

FOREIGN PATENT DOCUMENTS

EP  1384565  1/2004

(Continued)

OTHER PUBLICATIONS

English machine translation of JP 05-318607, retrieved from JPO database Apr. 4, 2010.*

(Continued)

*Primary Examiner* — Joseph Del Sole
*Assistant Examiner* — Timothy Kennedy
(74) *Attorney, Agent, or Firm* — Yee & Associates, P.C.

(57) ABSTRACT

An apparatus comprises a deformable platform and a laser delivery system. The deformable platform has a surface capable of changing to conform to a shape of an object as the object is being manufactured during a sintering process. The laser delivery system is capable of sintering powder on the deformable platform to manufacture the object.

17 Claims, 9 Drawing Sheets

U.S. PATENT DOCUMENTS

2004/0182202 A1     9/2004    Geving et al.

FOREIGN PATENT DOCUMENTS

| | | | |
|---|---|---|---|
| JP | 05318607 A | | 12/1993 |
| WO | WO 8802677 A | * | 4/1988 |
| WO | 2006105827 A1 | | 10/2006 |
| WO | 2006121797 A2 | | 11/2006 |

OTHER PUBLICATIONS

Safari et al, Rapid Protoyping, 2001, Encylopedia of Material: Science and Technology, pp. 1-13.*

U.S. Appl. No. 12/099,887, filed Apr. 9, 2008, Dietrich.

PCT Search Report for application PCT/US2009/060709 dated Mar. 4, 2010.

* cited by examiner

GEOMETRY ADAPTIVE LASER SINTERING SYSTEM

BACKGROUND INFORMATION

1. Field

The present disclosure relates generally to manufacturing and in particular, to a method and apparatus for manufacturing objects using laser sintering.

2. Background

Sintering is a process that may be used to make objects from powder. These objects include ceramic and/or metal objects. Sintering involves heating a material until the particles adhere to each other. With sintering, the material may be heated to a temperature that is below the melting point to provide for solid state sintering.

Laser sintering is a type of sintering in which a high power laser is used to fuse particles into a mass representing a three-dimensional object. With this type of manufacturing process, the laser selectively fuses powdered material by scanning cross-sections of powder in a bed. These cross-sections are scanned based on a three-dimensional description of the object or part. This description may be obtained from various sources such as, for example, a computer aided design file, scan data, or some other source.

After each cross-section is scanned, the bed is lowered and a new layer of material is applied on top of the scanned layer. The process is then repeated until the part is completed. Laser sintering may be useful for manufacturing prototype parts and/or limited or small numbers of parts. With currently used laser sintering machines, the powder used to create parts is often wasted during the build process. When a layer is scanned with the laser, the entire build layer is recoated with powder. At the end of the build job, some of this powder can be reclaimed and reused. However, a large amount of the powder is unusable and disposed of.

Further, with currently available laser sintering machines, scaling to create parts of larger sizes may be a function of the amount of powder. With a larger amount of powder, the amount of time needed to wait for the powder to cool down increases. Thus, with currently available machines, larger parts cannot be manufactured as quickly. Even further, with larger amounts of powder, differences in temperatures at different layers may result in parts that are warped or that do not meet tolerances.

Therefore, it would be advantageous to have a method and apparatus that overcome the problems as described above, as well as possibly other problems.

SUMMARY

In one advantageous embodiment, an apparatus comprises a deformable platform and a laser delivery system. The deformable platform has a surface capable of changing to conform to a shape of an object as the object is being manufactured during a sintering process. The laser delivery system is capable of sintering powder on the deformable platform to manufacture the object.

In another advantageous embodiment, a laser sintering apparatus comprises a build chamber, a deformable platform, a powder delivery system, a heating system, and a laser delivery system. The deformable platform is located inside the build chamber and has a surface capable of changing to conform to a shape of an object being manufactured while manufacturing of the object occurs within the build chamber. The powder delivery system is capable of delivering powder to the deformable platform. The heating system is capable of heating the powder and the deformable platform with a heated gas. The laser delivery system is capable of sintering the powder to manufacture the object.

In yet another advantageous embodiment, a method is present for manufacturing an object. A powder is deployed onto a deformable platform to form a current layer of powder. Laser energy is applied in a pattern on the current layer of powder to form a processed layer of powder. A portion of the deformable platform is then lowered. The deploying, applying, and lowering steps are repeated until the object is complete.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
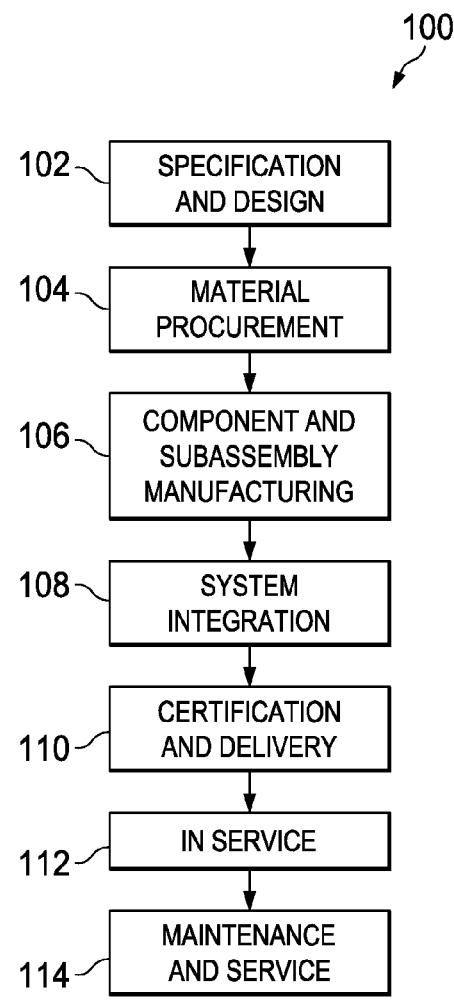
FIG. 1 is a diagram illustrating an aircraft manufacturing and service method in accordance with an advantageous embodiment.
Figure 2:
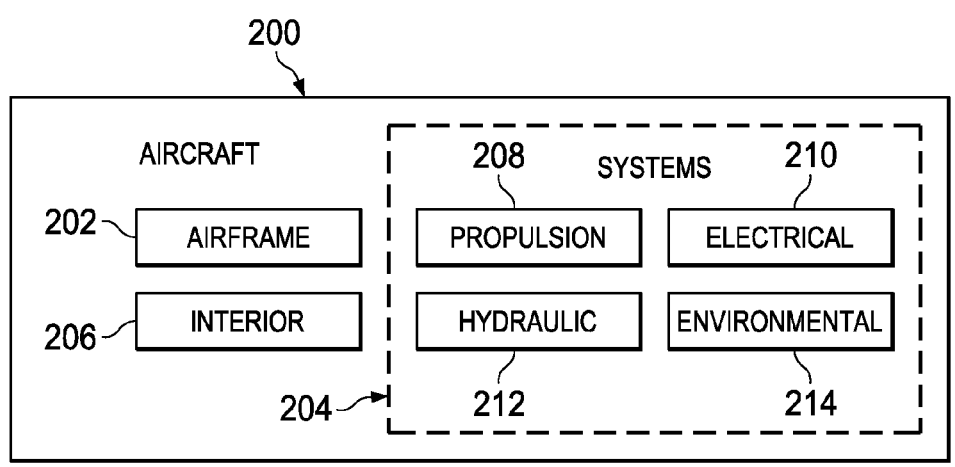
FIG. 2 is a diagram of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1. As one illustrative example, the different advantageous embodiments may be used to manufacture parts during component and subassembly manufacturing 106 and during maintenance and service 114.

The advantageous embodiments recognize that currently designed laser sintering systems have a build area that results in a waste of powder. Further, the different advantageous embodiments recognize that with larger parts, lower layers in the Z direction may recrystallize or resolidify while upper layers are sintering or in liquid form. This difference in the states of the powder may result in parts that are warped or do not meet tolerances. As a result, a part may have to be remade.

The different advantageous embodiments also recognize that the manufacturing process for parts is currently limited in speed by a number of factors. For example, the build cake formed from the different layers of powder and the sintering of that powder to form a number of parts is currently removed from the machine. These parts are dug out of the build cake at a separate station. This type of process increases the time needed to manufacture parts because of the transport time.

Thus, the different advantageous embodiments provide a method and apparatus for manufacturing parts using laser sintering. In these examples, an apparatus may include a deformable platform and a laser delivery system. The deformable platform is capable of incrementally changing shape to conform to a shape of an object as the object is being manufactured during its sintering process. The laser delivery system is capable of sintering powder on the deformable platform to manufacture the object.

In another advantageous embodiment, the laser sintering apparatus comprises a build chamber, a deformable platform, a powder delivery system, a heating system, and a laser delivery system. The powdered delivery system delivers powder to the deformable platform. The heating system is capable of heating the powder and the deformable platform with a heated gas. By conforming to the shape of the object, powder is only needed for portions of the deformable platform on which laser sintering is to be performed. Other areas in which laser sintering is not to be performed do not require additional layers of powder in one or more of these advantageous embodiments.

Figure 3:
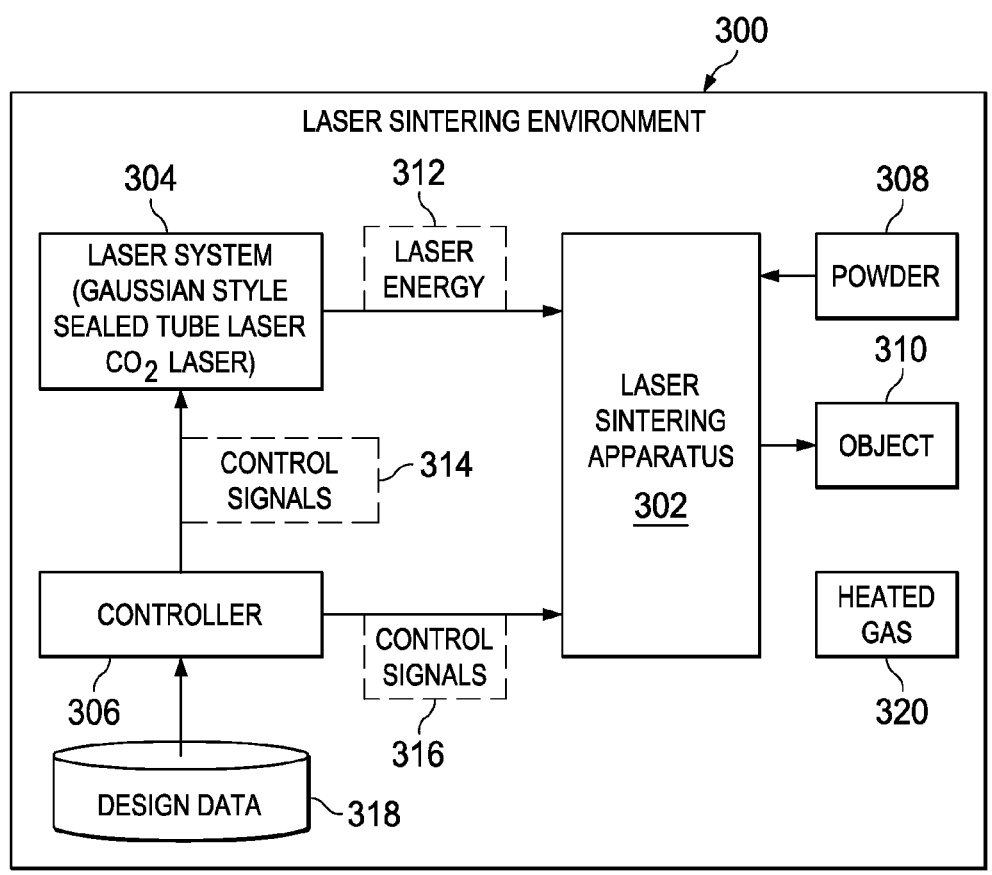
FIG. 3 is a diagram of a laser sintering environment in accordance with an advantageous embodiment.

With reference now to FIG. 3, a diagram of a laser sintering environment is depicted in accordance with an advantageous embodiment. In this example, laser sintering environment 300 includes laser sintering apparatus 302, laser system 304, and controller 306. In these illustrative examples, powder 308 may be placed into laser sintering apparatus 302 to create object 310 using laser energy 312 generated by laser system 304. Object 310 may take various forms. In these particular illustrative examples, object 310 may take the form of an aircraft part for aircraft 200 in FIG. 2.

Controller 306 may send control signals 314 to laser system 304 and control signals 316 to laser sintering apparatus 302 to control the sintering of powder 308 to form object 310. These control signals may be generated using design data 318.

In these illustrative examples, laser system 304 may be a Gaussian style sealed tube $CO_2$ laser. Thus, laser system 304 may implement a $CO_2$ laser. Powder 308 may take various forms. For example, without limitation, powder 308 may be a polymer, steel, titanium, an alloy mixture, composite, sand, or some other suitable material or combination of materials. Design data 318 also may take various forms. For example, design data 318 may be a computer aided design file or scan data.

In these advantageous embodiments, laser sintering apparatus 302 is capable of heating powder 308 prior to powder 308 being processed using heated gas 320. With this type of heating, problems with different temperatures in different portions of powder 308 within laser sintering apparatus 302 may be reduced. By heating powder 308 and/or laser centering apparatus 302, recrystallization and/or resolidification of lower levels may not occur at a rate that causes object 310 to warp and/or not meet tolerances. Additionally, heated gas 320 also may heat other components within laser centering apparatus 302 in a manner that may help maintain temperatures of already processed layers of powder 308 closer to the temperature of layers being sintered.

Another advantage that may be provided using heated gas 320 is a capability to reduce the amount of laser energy 312 that may be needed to perform sintering. By reducing laser energy 312, processing of powder 308 using higher temperature materials to manufacture a part may be more easily performed.

The illustration of laser sintering environment 300 in FIG. 3 is not meant to imply physical and/or architectural limitations to the manner in which different laser sintering environments may be implemented. For example, in other advantageous embodiments, laser system 304 may be implemented as part of laser sintering apparatus 302 rather than as a separate component. The different components are illustrated as functional components, which may be combined or further separated into additional blocks depending on the particular implementation. In yet another example, controller 306 may be implemented within laser sintering apparatus 302.

Although in these illustrative examples, object 310 has been described with respect to an aircraft part, other advantageous embodiments may be applied to other types of structures. For example, without limitation, other advantageous embodiments may be applied to a mobile platform, a stationary platform, a land-based structure, an aquatic-based structure, a space-based structure, and/or some other suitable object or structure.

More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable structure.

Figure 4:
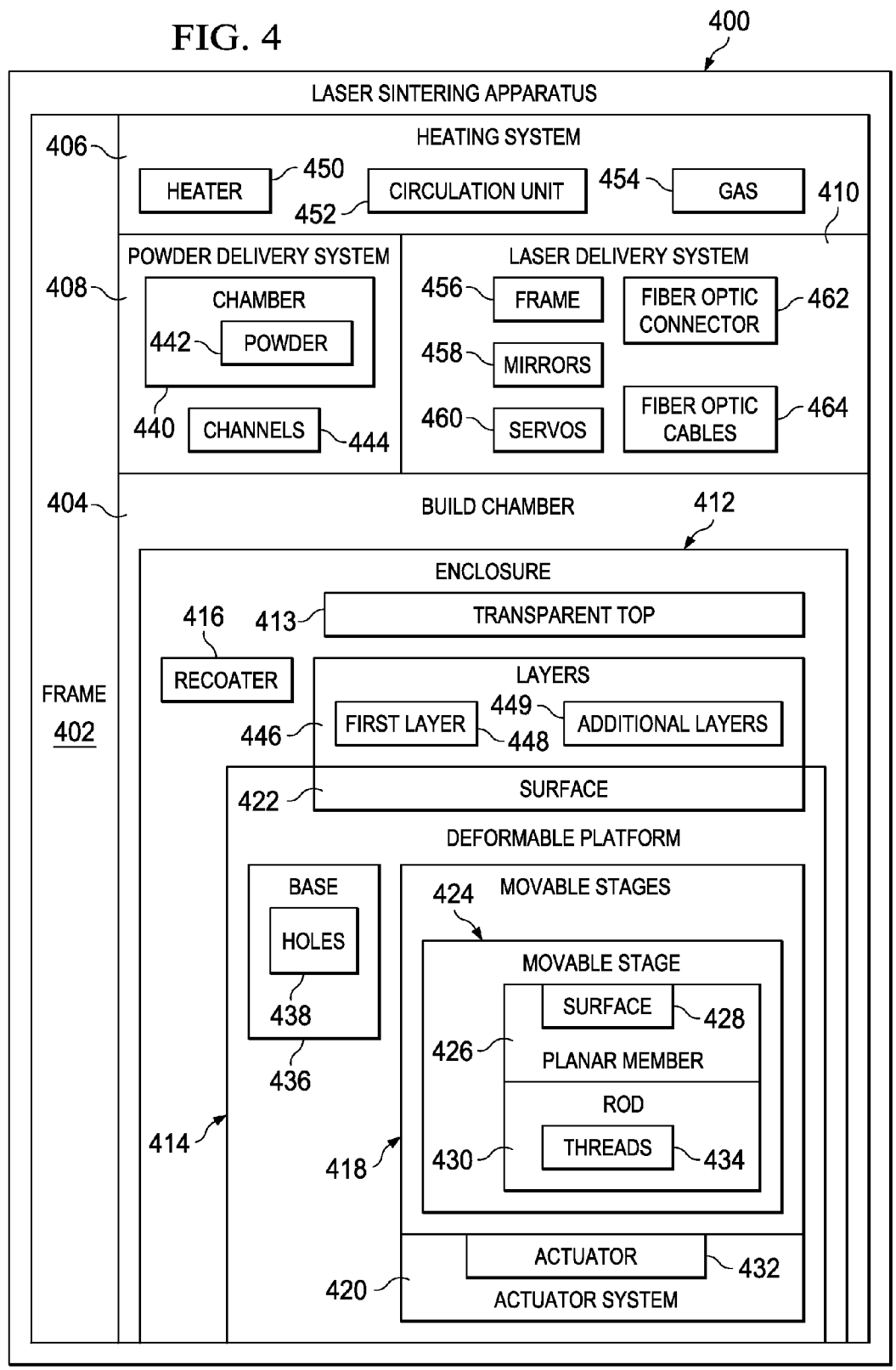
FIG. 4 is a diagram of a laser sintering apparatus in accordance with an advantageous embodiment.

With reference now to FIG. 4, a diagram of a laser sintering apparatus is depicted in accordance with an advantageous embodiment. In this illustrative example, laser sintering apparatus 400 is an example of one manner in which laser sintering apparatus 302 in FIG. 3 may be implemented. As illustrated, laser sintering apparatus 400 includes frame 402, build chamber 404, heating system 406, powder delivery system 408, and laser delivery system 410.

Frame 402 forms a structure in which different components of laser sintering apparatus 400 may be attached and/or placed. In this illustrative example, build chamber 404 includes enclosure 412 with deformable platform 414, recoater 416, and actuator system 420 located inside of enclosure 412. Enclosure 412 has transparent top 413 in these examples.

Deformable platform 414 has movable stages 418 that form surface 422 for deformable platform 414. Movable stage 424 is an example of a movable stage within movable stages 418. As depicted, movable stage 424 has planar member 426 with surface 428. Surface 428 is a portion of surface 422 for deformable platform 414. Additionally, rod 430 is attached to planar member 426. Planar member 426 may have various shapes for surface 428.

For example, the shape of planar member 426 may be a rectangle, a triangle, a square, a hexagon, or some other shape that may be combined with other shapes to form surface 422 for deformable platform 414. Further, different movable stages within movable stages 418 may have shapes different from other movable stages within movable stages 418 depending on the particular implementation.

Movable stage 424 may be moved by actuator 432 of actuator system 420. Actuator 432 may engage threads 434 on rod 430 to move movable stage 424 in a linear fashion. Deformable platform 414 also includes base 436, which contains holes 438 to receive movable stages 418. For example, rod 430 may be received within a hole in holes 438. Base 436 may provide a base and/or platform for movable stages 418.

During operation, each of movable stages 418 may be independently moved through actuator system 420 to cause surface 422 to be capable of changing to conform to a shape of an object that is being manufactured during the sintering process.

In other words, the different stages in movable stages 418 may be lowered as powder is deposited as a layer on deformable platform 414. The layer of powder may have a substantially smooth or planar surface. Portions of surface 422 may lower, while other portions of surface 422 may stay at a constant level each time a new layer of powder is deposited onto deformable platform 414 on top of another previous layer. With this type of deformability or configuration of surface 422, less powder may be required to create a part.

In this example, powder delivery system 408 includes chamber 440, which may hold powder 442. Further, channels 444 may connect chamber 440 to enclosure 412 in build chamber 404. Powder 442 may be introduced into build chamber 404 through channels 444.

In these illustrative examples, channels 444 may lead to recoater 416, located within enclosure 412. Recoater 416 may receive powder 442 from channels 444 and move within enclosure 412 to deposit layers 446 of powder 442 onto deformable platform 414. When first layer 448 is deposited, the layer is deposited in contact with surface 422 on deformable platform 414. As additional layers 449 in layers 446 are deposited onto deformable platform 414 during the sintering process, these layers are deposited on top of other layers on deformable platform 414.

Heating system 406 includes heater 450, circulation unit 452, and gas 454. In these examples, gas 454 is an inert gas. Gas 454 may take various forms. For example, without limitation, gas 454 may be nitrogen, carbon dioxide, argon, xenon, or some other inert gas. In these examples, gas 454 is an inert gas because inert gases are ones that do not react with elements.

Heater 450 is capable of heating gas 454. Circulation unit 452 is capable of circulating the heated form of gas 454 through various components within laser sintering apparatus 400. Heater 450 and circulation unit 452 may be implemented using any type of heater and/or circulation system. In these examples, heater 450 may be implemented in a number of different ways. For example, heater 450 may be a tube with heaters. The gas may be run through the tube and heated by the heaters. The temperature of the gas with this type of implementation may be a function of the flow rate through heater 450.

For example, circulation unit 452 may circulate heated gas 454 through build chamber 404 and powder delivery system 408. Gas 454 heats powder 442 and deformable platform 414 in these illustrative examples. Further, gas 454 may heat other components that may contact powder 442 in build chamber 404. In this manner, less laser energy or power may be required to perform sintering operations since powder 442 may be heated using gas 454 and heat applied to deformable platform 414 through gas 454.

Additionally, in some advantageous embodiments, heater 450 also may directly heat deformable platform 414. With these types of heating, higher temperature materials may be used with less waste.

In these examples, enclosure 412 is sealed and may have a connection to heating system 406 and powder delivery system 408. In this manner, gas 454 may circulate within laser sintering apparatus 400 to heat powder 442 and other components such as, for example, deformable platform 414.

In this illustrative example, laser delivery system 410 includes frame 456, mirror 458, servos 460, fiber optic connector 462, and fiber optic cable 464. Frame 456 is movable along the top of enclosure 412, which has transparent top 413. Transparent top 413 may be made of any material that is capable of allowing laser energy to pass through transparent top 413 to sinter powder 442 located within enclosure 412. For example, transparent top 413 may be made up of glass.

Mirrors 458 may be moved and/or positioned to direct laser energy in a pattern onto layers 446 within build chamber 404. Servos 460 may move frame 456 and mirrors 458 in these examples. Fiber optic connector 462 provides a connection to fiber optic cables 464 to receive laser energy, which may be directed by mirrors 458.

Another feature provided by laser sintering apparatus 400 is the capability to remove the part from the powder in build chamber 404 without having to move the entire build cake to a separate location or station as is currently done. This capability is provided because less powder is left over due to the manner in which an object may be constructed using deformable platform 414.

The illustration of laser sintering apparatus 400 in FIG. 4 is not meant to imply physical and/or architectural limitations to the manner in which different advantageous embodiments may be implemented. For example, in some advantageous embodiments, other components in addition to or in place of the ones illustrated may be used. As one example, instead of having multiple mirrors for mirror 456, a single mirror may be used in some advantageous embodiments. In yet other advantageous embodiments, laser delivery system 410 also may include the laser unit itself.

Figure 5:
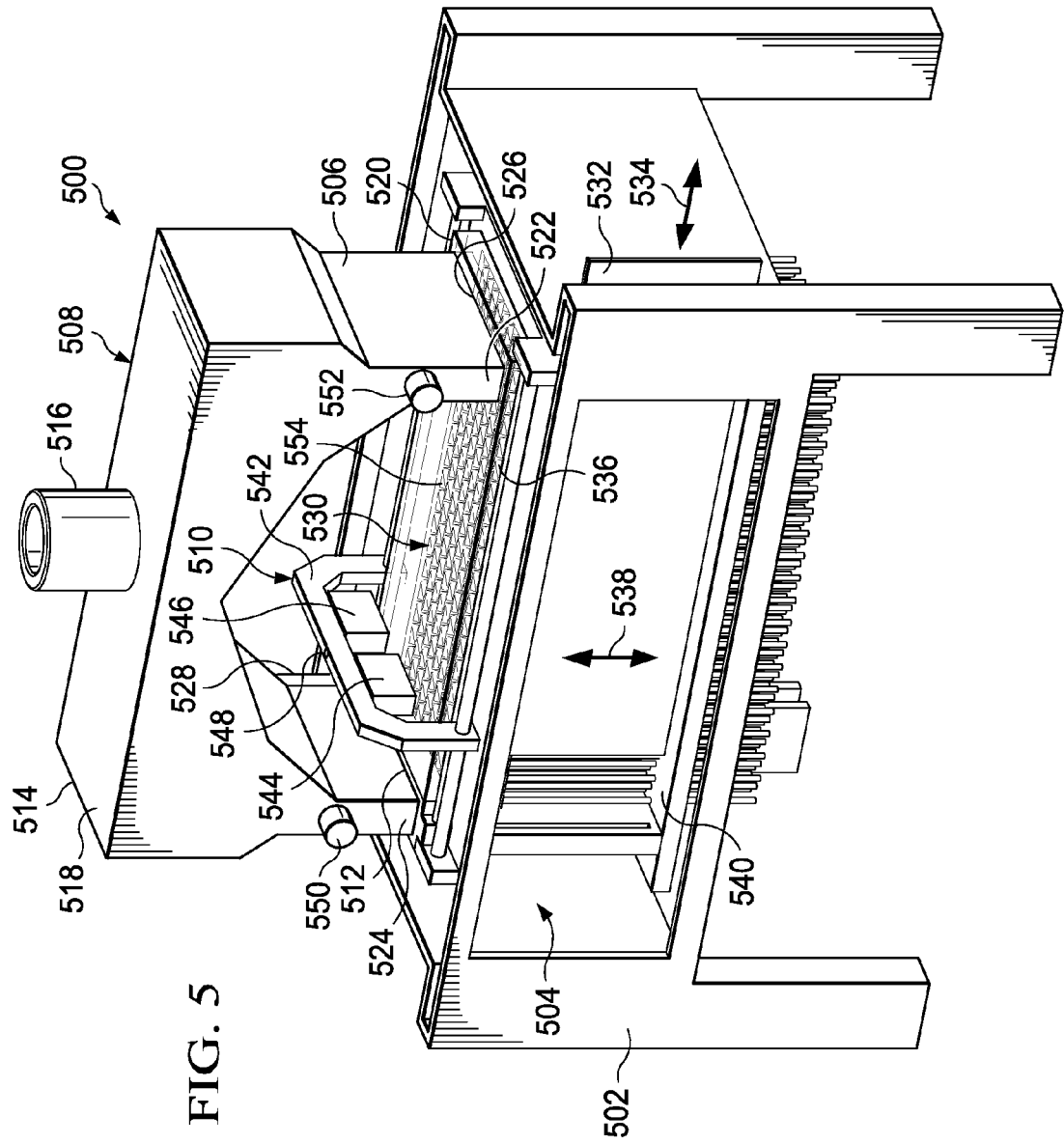
FIG. 5 is a diagram of a laser sintering apparatus in accordance with an advantageous embodiment.

With reference now to FIG. 5, a diagram of a laser sintering apparatus is depicted in accordance with an advantageous embodiment. Laser sintering apparatus 500 is an example of one implementation of laser sintering apparatus 400 in FIG. 4. In this depicted example, laser sintering apparatus 500 has frame 502 to which various components of laser sintering apparatus 500 may be attached. For example, frame 502 forms part of build chamber 504. Laser sintering apparatus 500 also has powder delivery system 506, heating system 508, laser delivery system 510, and recoater 512.

As illustrated, enclosure 514 contains both powder delivery system 506 and heating system 508. In some advantageous embodiments, heating system 508 may not be present within laser sintering apparatus 500. In these depicted examples, enclosure 514 is connected to build chamber 504. Further, enclosure 514 also has gas port 516 located on top side 518 of enclosure 514.

Enclosure 514 may be formed using a number of different types of materials. Enclosure 514 may be comprised of various metals such as, for example, without limitation, aluminum, steel, or some other suitable material. For example, enclosure 514 may be formed using an industrial grade welded sheet metal.

Enclosure 514 has transparent top 520. Transparent top 520 allows laser energy to be delivered into build chamber 504 from laser delivery system 510, which is located on the exterior of build chamber 504. Transparent top 520 has channels 522 and 524, which may be coupled to channels 526 and 528 to allow for the delivery of powder from powder delivery system 506 into build chamber 504.

Build chamber 504 also contains the deformable platform 530 and door 532. Build chamber 504 may have various dimensions depending on the particular implementation. For example, build chamber 504 may be 6 feet long, 4 feet wide, and 4 feet tall. Of course, the dimensions may change depending on the particular implementation. Deformable platform 530 is a platform on which powder may be deposited to manufacture an object. Door 532 provides access to the object after the manufacturing process has been completed. As seen in this example, door 532 may be moved along the direction of arrow 534.

As can be seen in this example, deformable platform 530 includes movable stages 536, in which each of the movable stages may be moved linearly along the direction of arrow 538. In this example, movable stages 536 are supported by base 540 inside of build chamber 504.

Recoater 512 is located within build chamber 504 and is capable of receiving powder from powder delivery system 506 through channels 522 and 526 or through channels 524 and 528, depending on the location of recoater 512. Recoater 512 may be moved along the direction of arrow 534 to deposit powder in a layer on deformable platform 530.

Laser delivery system 510 has frame 542. Section 544 and section 546 in frame 542 contain one or more mirrors capable of directing laser energy in a pattern on the powder that may be deposited on deformable platform 530. Frame 542 also has fiber optic connector 548, which may couple laser energy from a laser to mirrors within sections 544 and 546 for redirection into build chamber 504.

Enclosure 514 in build chamber 504 forms a sealed volume or manufacturing area. The term sealed as used herein does not mean that the area must be gas-tight. The area may be sealed such that gas cannot enter or leave these areas. In other advantageous embodiments, the areas may be sealed such that the introduction of gas through gas port 516 may provide heating as desired for the powder and/or movable stages 536 of deformable platform 530.

In other advantageous embodiments, the sealed volume may not be airtight. With this type of implementation, a positive pressure is maintained in build chamber 504. The pressure may be maintained by a pressure and/or temperature regulator. In these examples, the temperature of the gas may depend on the type of material being processed. As a non-limiting example, the temperature of the gas may be from around 100 degrees Celsius to around 400 degrees Celsius.

In operation, gas may be introduced into powder delivery system 506 and build chamber 504 through gas port 516. Heating system 508 within enclosure 514 heats the gas. Depending on the particular implementation, the gas may be preheated prior to being introduced through gas port 516. The heated gas is circulated and heats powder located within enclosure 514 and build chamber 504.

Further, the heated gas also may heat deformable platform 530. Heating deformable platform 530 may provide indirect heating of the powder located on deformable platform 530. The use of an inert gas to heat the powder and deformable platform 530 is in contrast to currently used mechanisms in which quartz, rod heaters, or carbon fiber heating elements are employed to directly heat build chamber 504.

The heating of these components may produce the amount of laser energy needed to sinter the powder into the shape of a part. This type of capability is useful when higher temperature materials are used for the powder.

Further, by providing a heated gas, processed portions of the powder may not cool off as quickly as with current laser sintering systems. As a result, warping that may occur with temperature gradients or differences between different portions of a part may be reduced or eliminated.

After the powder has been heated to a desired temperature, the powder may be introduced into build chamber 504 in layers. In these examples, servo delivery unit 550 and servo delivery unit 552 are part of powder delivery system 506 and operate to introduce an amount of powder from enclosure 514 into build chamber 504 to be deposited as a layer onto surface 554 of movable stages 536 of deformable platform 530. In these examples, servo delivery units 550 and 552 may comprise a servo motor with a wheel that allows powder to be deposited into recoater 512.

Recoater 512 moves along the direction of arrow 534 to deposit a layer of powder onto surface 554 of movable stages 536 of deformable platform 530. After a layer of powder has been deposited onto deformable platform 530, laser delivery system 510 may also move along the direction of arrow 534 to deliver laser energy in a pattern to form a shape for the object.

After the layer of powder has been processed, at least a portion of deformable platform 530 may be lowered. Thereafter, additional powder may be sent to recoater 512 to deposit another layer of powder onto surface 554 of deformable platform 530. This powder is deposited onto deformable platform 530 on top of previous layers. This new layer of powder may then be processed using laser energy delivered through laser delivery system 510. Each time a layer of powder is deposited, recoater 512 may smooth out the layer such that the top portion of the layer has a substantially planar surface.

With this type of movement of deformable platform 530, less powder may be used. Specifically, less powder is deposited onto areas in which movable stages 536 have not moved downwards or have moved downwards less than other portions.

Laser sintering apparatus 500 may be constructed by modifying currently available laser sintering systems. The different advantageous embodiments may use a currently available laser sintering system and modify build chamber 504 to include deformable platform 530. Further, laser sintering apparatus 500 may be modified to include heated gas and laser delivery system 510. Also, in other advantageous embodiments, door 532 may be included in a manner that allows for removing the part from the build chamber.

Figure 6:
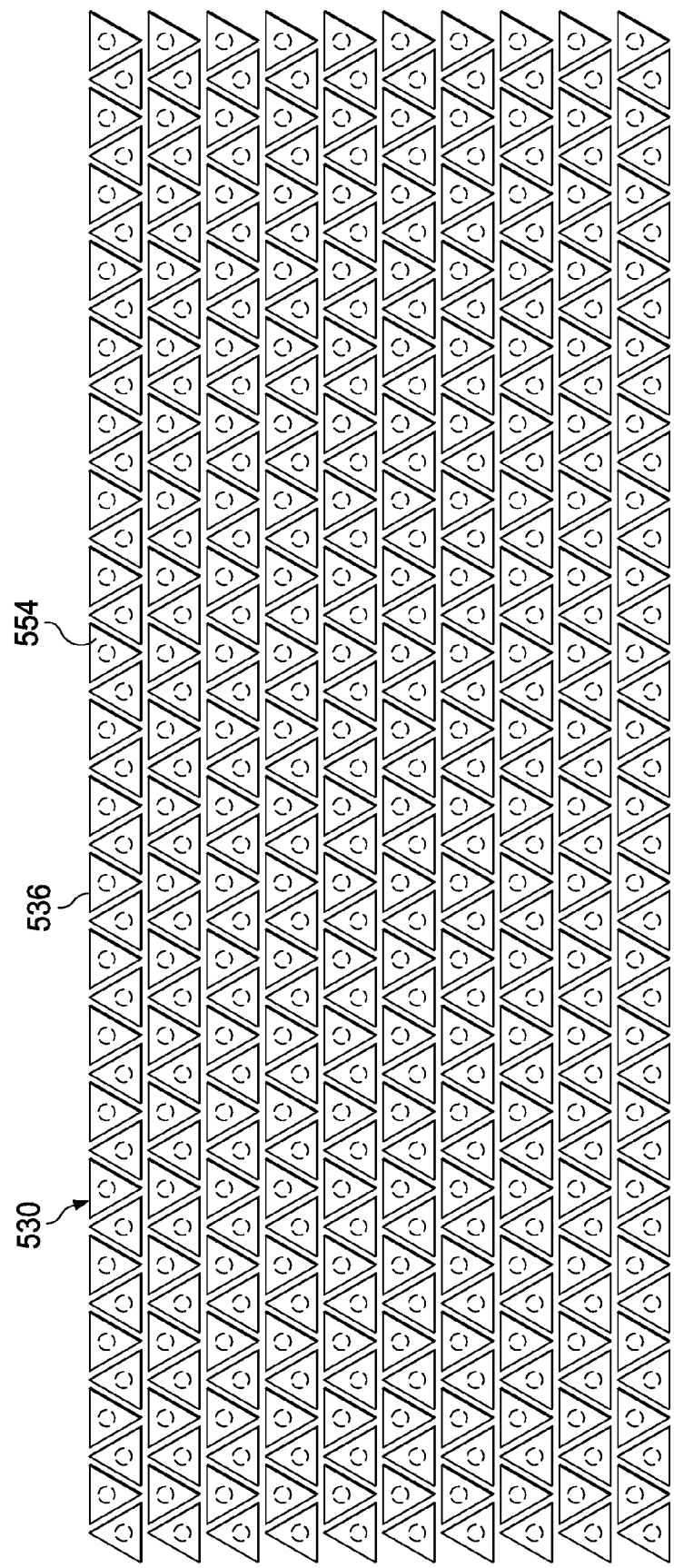
FIG. 6 is a diagram of a top view of a deformable platform in accordance with an advantageous embodiment.

With reference now to FIG. 6, a diagram of a top view of a deformable platform is depicted in accordance with an advantageous embodiment. In this example, deformable platform 530 contains movable stages 536, in which each movable stage has a triangular shape. These triangular shapes interlock or fit together to form surface 554 for deformable platform 530.

Each movable stage within movable stages 536 is independently movable in a linear direction. This type of independent movement of movable stages 536 allows deformable platform 530 to conform to the shape of an object being manufactured.

Figure 7:
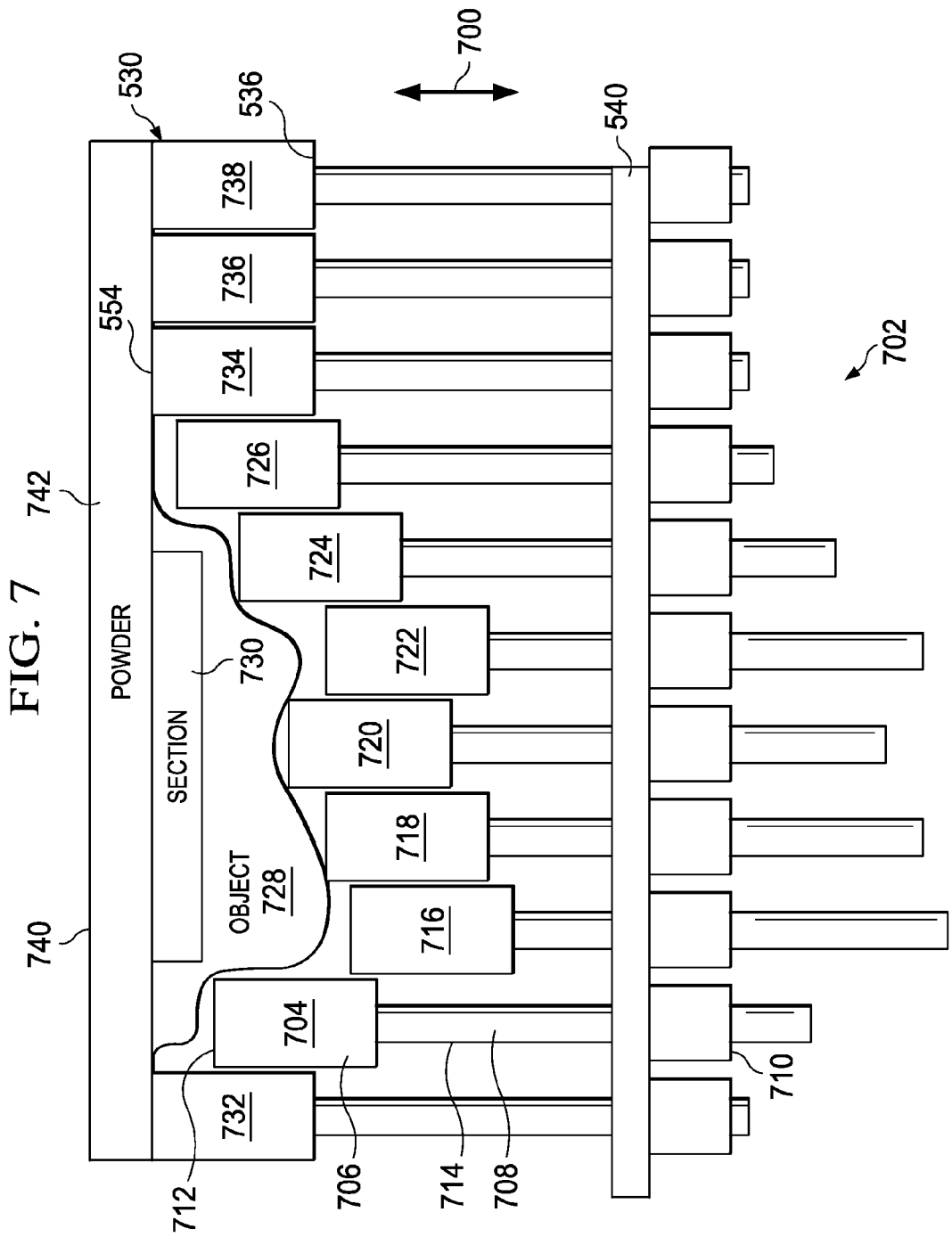
FIG. 7 is a side view of a deformable platform in accordance with an advantageous embodiment.

With reference now to FIG. 7, a side view of a deformable platform is depicted in accordance with an advantageous embodiment. In this example, a portion of deformable platform 530 is shown from a side view. Movable stages 536 may be moved along the direction of arrow 700 using actuator system 702.

Movable stage 704 is an example of one movable stage within movable stages 536. Movable stage 704 has planar member 706, rod 708, and actuator 710. Planar member 706 has surface 712. Rod 708 has threads 714, which may be engaged by actuator 710 to move planar member 706 along the direction of arrow 700. Rod 708 is supported by base 540 and actuator 710 in these examples.

In this example, movable stages 704, 716, 718, 720, 722, 724, and 726 have been moved downward to conform to the shape of object 728. Section 730 may be in a molten form after the processing of powder by laser energy. In this example, movable stages 732, 734, 736, and 738 also have moved downwards, and layer 740 of powder 742 has been deposited onto deformable platform 530. As can be seen, movable stages 732, 734, 736, and 738 may require less of powder 742 due to being moved less further downwards than movable stages 704, 716, 718, 720, 722, 724, and 726.

A recoater may redistribute excess powder onto other areas such as those when movable stages 704, 716, 718, 720, 722, 724, and 726 are lowered. In this manner, less of powder 742 is required to create object 728 as compared to creating the same object with conventional laser sintering devices that are currently available.

Figure 8:
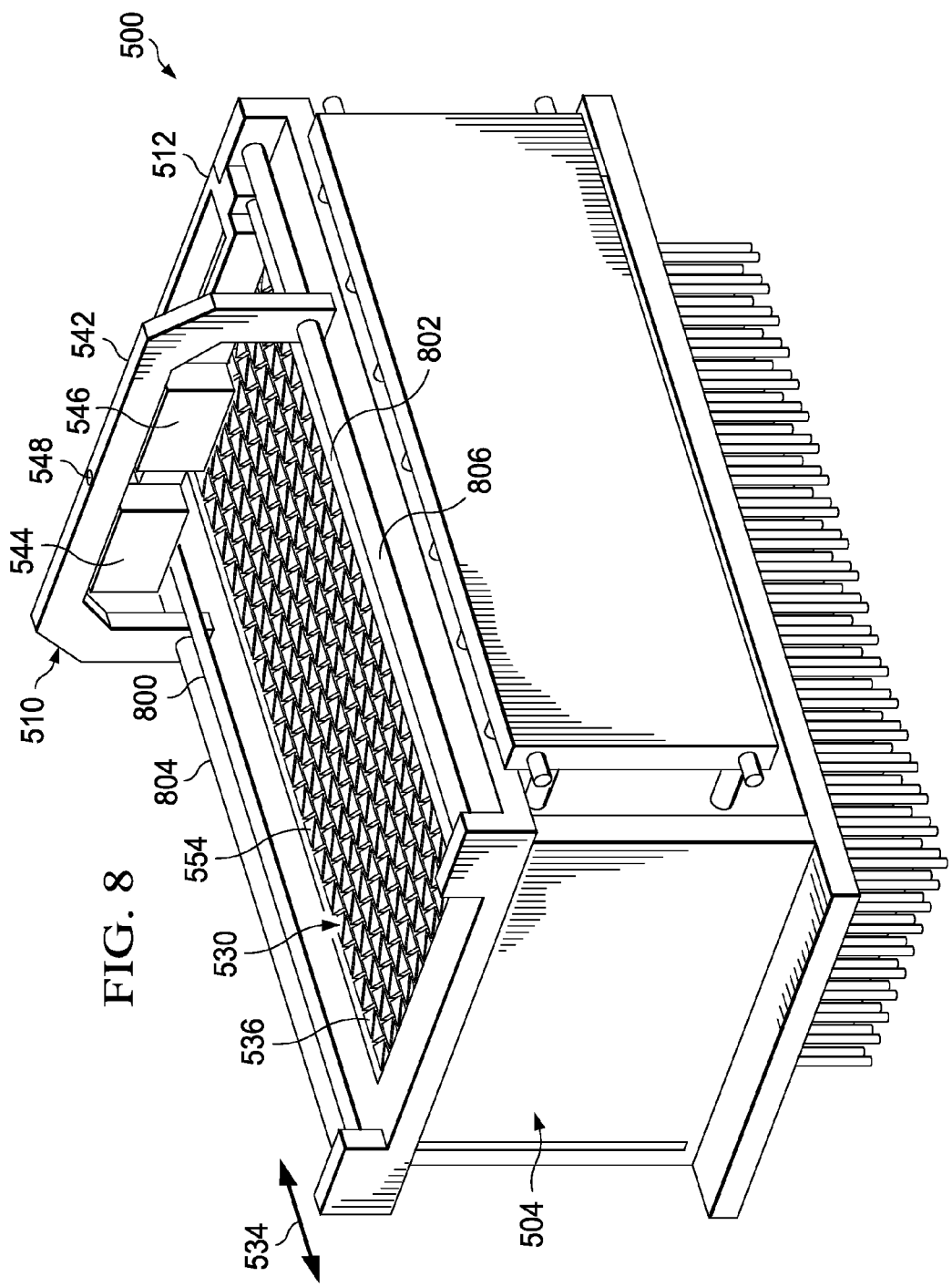
FIG. 8 is a portion of a laser sintering apparatus in accordance with an advantageous embodiment.

With reference now to FIG. 8, a portion of a laser sintering apparatus is depicted in accordance with an advantageous embodiment. In this example, a portion of laser sintering apparatus 500 is depicted to illustrate mechanisms for laser delivery system 510 and recoater 512.

In these examples, recoater 512 may move in the direction of arrow 534 along ball screw rod 800 and ball screw rod 802. Frame 542 of laser delivery system 510 may move along the direction of arrow 534 using ball screw rod 804 and ball screw rod 806. These ball screw rods may be turned by actuators (not shown) to move recoater 512 and frame 542.

Figure 9:
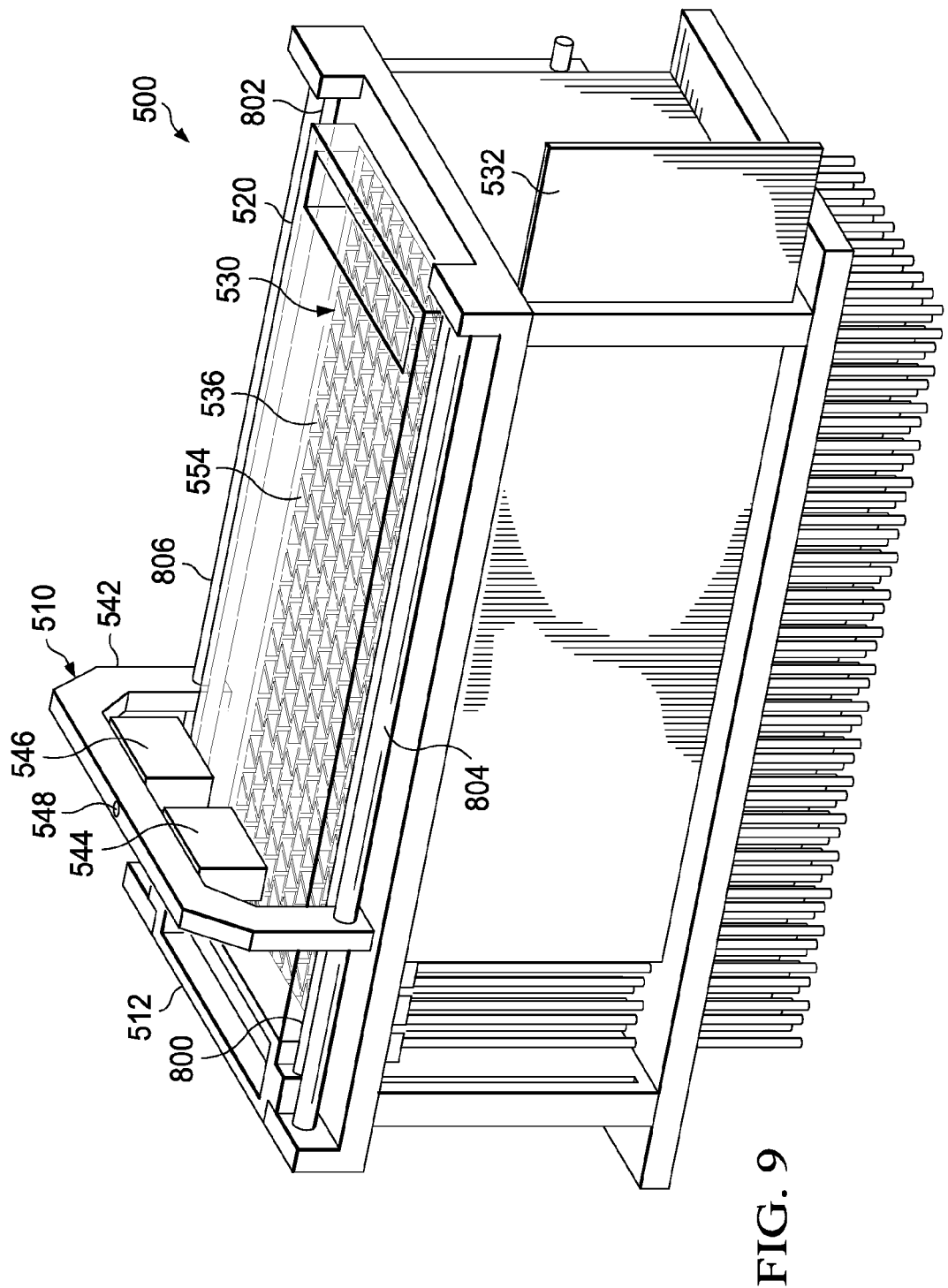
FIG. 9 is another view of a portion of a laser sintering apparatus in accordance with an advantageous embodiment.

With reference now to FIG. 9, another view of a portion of a laser sintering apparatus is depicted in accordance with an advantageous embodiment. In this example, a portion of laser sintering apparatus is depicted to show another view of recoater 512 and laser delivery system 510.

The illustrations of laser sintering apparatus 500 in FIGS. 5-9 are not meant to imply physical and/or architectural limitations to the manner in which different advantageous embodiments are implemented. For example, in some advantageous embodiments, a laser may be part of laser delivery system 510 located in frame 502. In other advantageous embodiments, other types of actuators may be used to move movable stages 536 other than actuators that engage threads on rods.

Further, in the different advantageous embodiments, connections for the actuators and other components are present to provide communication to a controller to control the movement and operation of the different components within laser sintering apparatus 500. Also, although build chamber 504 has a rectangular shape, other shapes may be employed.

For example, build chamber 504 may be square or have some other suitable shape at which laser delivery system 510 may direct energy to perform sintering to create an object. As yet another example, in some advantageous embodiments, other types of mechanisms may be used to move the different components. For example, frame 542 of laser delivery system 510 may be moved using a rail with teeth, a servo with a cable, or some other suitable mechanism.

Other advantageous embodiments may have other components in addition to or in place of the ones depicted for laser sintering apparatus 500. In yet other advantageous embodiments, fewer components may be used. For example, in some embodiments, door 532 may swing open instead of slide. Door 532 may be manually opened or motorized. In still other embodiments, laser delivery system 510 may include a laser unit or device.

Figure 10:
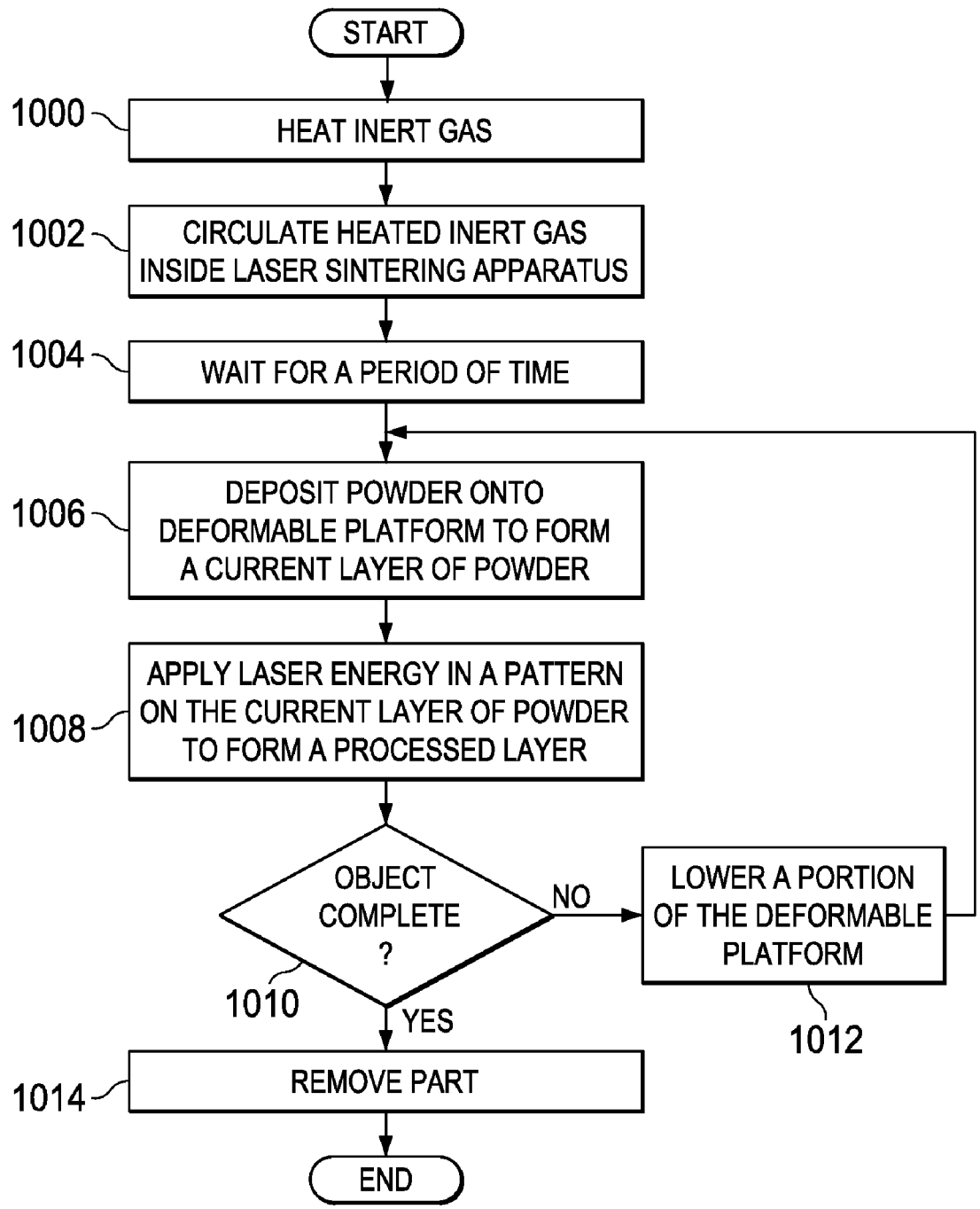
FIG. 10 is a flowchart of a process for manufacturing an object is depicted in accordance with an advantageous embodiment.

With reference now to FIG. 10, a flowchart of a process for manufacturing an object is depicted in accordance with an advantageous embodiment. The process illustrated in FIG. 10 may be implemented using a laser sintering environment such as, for example, laser sintering environment 300 in FIG. 3. The laser sintering apparatus employed may be, for example, laser sintering apparatus 400 in FIG. 4.

The process begins by heating inert gas (operation 1000). The inert gas is nitrogen in this depicted example. The heating may take place inside of the laser sintering apparatus or externally depending on the particular implementation. The heated inert gas is circulated inside the laser sintering apparatus (operation 1002). Operation 1002 is performed to heat the powder and the deformable platform in the laser sintering apparatus. The process then waits for a period of time while the inert gas is circulated within the laser sintering apparatus (1004).

Operation 1004 is performed to allow the powder and the deformable platform to heat up to some desired temperature. In these examples, the temperature to which the powder and/or platform may be heated varies depending on the particular material used for the powder. The temperature may be, for example, without limitation, from around 100 degrees Celsius to around 400 degrees Celsius.

The process then deposits powder onto the deformable platform to form a current layer of powder (operation 1006). Next, the process applies laser energy in a pattern on the current layer of powder to form a processed layer of powder (operation 1008). This processed layer of powder has sections that have become sintered and/or molten to begin forming the object. The pattern is generated based on design data for the object. A determination is then made as to whether the object is complete (operation 1010).

If the object is not complete, a portion of the deformable platform is lowered (operation 1012). Lowering a portion of the deformable platform may be accomplished by moving a number of movable stages downward with respect to the build of the object. The lowering of the portion of the deformable platform is performed to cause the deformable platform to conform to a shape of the object as it is being created. The process then returns to operation 1006 to deposit another layer of powder onto the deformable platform on top of the current layer of powder. In depositing another layer of powder, less powder may be required because only a portion of the deformable platform is lowered to change the shape of the deformable platform to conform to the shape of the object.

As a result, powder may be needed only on the portions in which movable stages have been lowered. Other portions may not require powder when additional powder is deposited onto the deformable platform. In these examples, the powder is deposited to form a layer that is substantially planar.

Thus, for portions of the deformable platform that do not move downward, additional powder may not be necessary to form the current layer. In other words, the current layer may contain powder that has been deposited from a previous deposition of powder in those sections in which the movable stages have not moved downward.

With reference again to operation 1010, when the object is complete, the part is removed (operation 1014), with the process terminating thereafter. In these examples, a part may be removed from the build chamber without having to move the part and powder to another station. This additional feature may be provided because the deformable platform reduces the amount of powder that is leftover. As a result, the part may be more easily removed from the build chamber without having to move the entire build cake as is currently performed.

The flowchart and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method and apparatus for manufacturing objects. In one or more of the advantageous embodiments, a deformable platform has a surface capable of changing to conform to a shape of an object as the object is being manufactured during a sintering process. A laser delivery system is present that is capable of sintering powder on the deformable platform to manufacture the object.

Further, in one or more of the different advantageous embodiments, heated gas may be introduced into the build chamber. With the different advantageous embodiments, powder may be deposited only on the areas on which sintering has occurred. As a result, the amount of powder needed and processing energy consumed may be reduced.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a deformable platform having a surface configured to conform to a shape of an object as the object is being manufactured during a sintering process, wherein the deformable platform comprises a plurality of moving stages forming the surface of the deformable platform;
   an enclosure having a transparent top, wherein the deformable platform is located inside the enclosure;
   a laser delivery system located outside of the enclosure and configured to pass laser energy through the transparent top into the enclosure and to sinter powder on the deformable platform to manufacture the object;
   a powder delivery system configured to deliver the powder to the deformable platform through channels in the transparent top; and
   a heating system adjacent to the powder delivery system and configured to heat the powder using only heated gas prior to the powder delivery system delivering the powder to the deformable platform and prior to the laser delivery system sintering the powder.

2. The apparatus of claim 1, wherein the plurality of moving stages are configured to move in a linear direction during the sintering process.

3. The apparatus of claim 1, wherein the powder delivery system delivers a first amount of powder on a first number of movable stages of the plurality of movable stages and a second amount of powder on a second number of movable stages of the plurality of movable stages, wherein the first number of movable stages moves less during the sintering process than the second number of movable stages, and wherein the first amount of powder is less than the second amount of powder.

4. The apparatus of claim 1, wherein each movable stage in the plurality of movable stages forming the surface comprises a planar member forming a portion of the surface, a rod attached to the planar member, and an actuator capable of moving the rod in a linear direction.

5. The apparatus of claim 1, further comprising:
   a recoater located inside the enclosure, wherein the recoater is configured to deposit a layer of powder on the deformable platform during manufacturing of the object.

6. The apparatus of claim 1, wherein the heating system comprises:
   a heater configured to heat a gas to form a heated gas; and
   a circulation unit configured to circulate the heated gas.

7. The apparatus of claim 1, wherein the heating system comprises:
a gas port configured to receive a heated inert gas.

8. The apparatus of claim 5, wherein the laser delivery system comprises:
a frame;
a number of mirrors mounted to the frame, wherein the number of mirrors is configured to direct laser energy onto powder on the surface of the deformable platform;
a servo system mounted to the frame, wherein the servo system is configured to position the number of mirrors and moving the frame over the transparent top; and
a number of fiber optic connectors, wherein the fiber optic connectors are configured to receive the laser energy from a number of fiber optic cables connected to the number of fiber optic connectors and direct the laser energy to the number of mirrors.

9. The apparatus of claim 1, wherein the object is a part for a structure selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, and a building.

10. A laser sintering apparatus comprising:
a build chamber;
a deformable platform located inside the build chamber, wherein the deformable platform has a surface comprising a plurality of movable stages configured to conform to a shape of an object being manufactured while manufacturing of the object occurs within the build chamber;
a powder delivery system configured to deliver powder to the deformable platform through channels in a transparent top of the build chamber;
a heating system adjacent to the powder delivery system and configured to heat the powder and the deformable platform with only a heated gas, wherein the heating system heats the powder prior to the powder delivery system delivering the powder to the deformable platform; and
a laser delivery system configured to sinter the powder on the deformable platform to manufacture the object.

11. The laser sintering apparatus of claim 10, wherein the powder delivery system delivers a first amount of powder on a first number of movable stages of the plurality of movable stages and a second amount of powder on a second number of movable stages of the plurality of movable stages, wherein the first number of movable stages moves less during a sintering process than the second number of movable stages, and wherein the first amount of powder is less than the second amount of powder.

12. The laser sintering apparatus of claim 10, wherein each movable stage in the plurality of movable stages forming the surface comprises a planar member forming a portion of the surface, a rod attached to the planar member, and an actuator capable of moving the rod in a linear direction.

13. The laser sintering apparatus of claim 10 further comprising:
a recoater located within an enclosure of the build chamber, wherein the recoater is configured to receive the powder from the powder delivery system and configured to form a layer of the powder on the surface of the deformable platform.

14. The laser sintering apparatus of claim 10, wherein the heating system comprises:
a heater configured to heat an inert gas to form a heated inert gas; and
a circulation unit configured to circulate the heated inert gas within the build chamber and the powder delivery system.

15. The laser sintering apparatus of claim 14, wherein the laser delivery system comprises:
a frame;
a number of mirrors mounted to the frame, wherein the number of mirrors is configured to direct laser energy onto powder on the surface of the deformable platform;
a servo system mounted to the frame, wherein the servo system is configured to position the number of mirrors and moving the frame over the transparent top; and
a number of fiber optic connectors, wherein the fiber optic connectors are configured to receive the laser energy from a number of fiber optic cables connected to the number of fiber optic connectors and direct the laser energy to the number of mirrors.

16. The laser sintering apparatus of claim 10, wherein the object is a part for a structure selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, and a building.

17. A method for manufacturing an object, the method comprising:
circulating a heated inert gas into an enclosure using a heating system to heat a powder, wherein the powder is heated using only the heated inert gas prior to applying laser energy and wherein the heated inert gas further heats a deformable platform;
deploying the powder onto the deformable platform through channels in a transparent top of the enclosure to form a current layer of powder;
applying the laser energy in a pattern on the current layer of powder to form a processed layer of powder;
lowering a portion of the deformable platform; and
repeating the deploying, applying, and lowering steps until the object is complete.

* * * * *